Fig-1

INVENTOR
RALPH POLK, JR.
BY Mason, Fenwick & Lawrence
ATTORNEYS

FIG-6

United States Patent Office 3,451,451
Patented June 24, 1969

3,451,451
BANANA PEELER
Ralph Polk, Jr., P.O. Box 3208, Tampa, Fla. 33601
Filed July 17, 1967, Ser. No. 653,739
Int. Cl. A23n 7/00
U.S. Cl. 146—224                         16 Claims

ABSTRACT OF THE DISCLOSURE

A method for peeling bananas including posititoning a banana in a predetermined plane and maintaining it there, cutting off the bottom end of the fruit, slitting the peel from the cut end centrally along the curved sides of the fruit in the predetermined plane, gripping the cut ends of the slit peel segments, and, after releasing the holding of the fruit in the predetermined plane, pulling the peel segments in opposite directions from the predetermined plane to strip it from the fruit. The disclosure also includes a machine for carrying out the method, which has a turret mounting a plurality of peeling heads rotatable in an orbit and having means to insert a banana into the head, clamp it in position centered on a reference plane, cut the end from the fruit, split the peel longitudinally and grasp and pull the split peel from the fruit. The various mechanisms are operated sequentially by cams as the turret rotates.

Background of the invention

This invention relates to a method and machine for peeling bananas, and particularly for peeling whole bananas so as to obtain whole, peeled fruit.

Although the peel of bananas is easily stripped from the meat, the fruit does not lend itself to mechanical operations because of its peculiar shape. It is not only curved, but the curvature varies in different fruit, with some being almost straight and others quite arched. There is also a wide variation in the size of the fruit, and the peel or skin, varies in thickness. Because of these irregularities many problems arise in connection with the positioining and handling of fruit by mechanical means.

There have been some previous attempts at peeling bananas by machinery, but in all presently known devices, the entire fruit has been split one or more times lengthwise, and then cut into small segments. Only the segments have been peeled. These machines have been devised more for obtaining banana pulp than as machines for peeling the fruit. Sofar as is presently known, no machines have been available for peeling whole fruit and obtaining the whole, peeled friut for subsequent use.

Summary of the invention

The general object of the present invention is to provide a method and means for peeling whole bananas, which will leave the edible portion of the fruit in one piece for subsequent packing, or other use.

A more specific object of the invention is to provide a method of peeling bananas wherein the banana will be positioned so as to place its curved contour, or silhouette, in a predetermined plane and center it on that plane, then cut off the end of the fruit, and split the cut end along the predetermined plane and spread the split edges to opposite sides of the plane. The peel will then be split from the cut end lengthwise along the predetermined plane on opposite sides of the fruit, and the slit ends of the peel will be grasped at the cut end and pulled outwardly from the predetermined plane in opposite directions to strip the peel from the fruit.

Another object of the invention is to provide means for positioning bananas with their curved silhouette in a determined plane and hold the fruit in this position during initial operations of cutting off the end, slitting the cut end, slitting the peel along the full length of the fruit and grasping the ends of the slit peel.

It is also an object of the invention to provide means for slitting the fruit which will be operative whether the convex curvature of the fruit occupying a predetermined positioning plane arches to the right or to the left.

Yet a further object is to provide mechanism of this kind wherein there are means for gripping the ends of the slit peel and moving outwardly in opposite directions to strip the peel of the fruit.

Other objects of the invention will become apparent from the following description of one preferred embodiment thereof, when taken in conjunction with the drawings which accompany, and form part of, this specification.

Brief description of the drawings

FIGURE 6 is a further enlarged side elevation of the operative parts of one of the heads of the machine, viewed substantially from the direction shown by the line 6—6 of FIGURE 3, with the head being shown in position above a fruit centering trough of the machine;

*Description of the preferred embodiment*

The invention concerns a method of peeling whole bananas, so as to obtained the whole edible portion of the fruit, and to a machine for automatically carrying out the method. In order to facilitate an understanding of the invention, the method will be described first and then apparatus for carrying out the method will be described.

The peculiar shape of a banana requires that the fruit be positioned with relative exactitude to provide a reference to which all operations of the method can be keyed. It is proposed, therefore, that the banana be positioned so that the entire span of its curvature will lie in a single plane. It is immaterial to the method whether the convex, outside curvature of the fruit lies to the right or the left of the fruit ends. It is important that the ends of the fruit and the entire convex curvature lie in a single plane. It is also important that the fruit be centered with respect to this predetermined plane. In other words, half of the thickness of the fruit will lie to one side of the plane and the other half will lie to the other side of the plane. When the fruit is in position with respect to the predetermined plane, it is then held in this position throughout the various steps of preparing the fruit for the final stripping of the peel from the edible portion.

When the fruit is in position and being held, one end is cut off. The portion cut off will be relatively short, perhaps in the order of one-quarter inch. This is done to remove the end covering of the peel and to expose the tip of the edible portion of the fruit. The cut is preferably made square, or normal, to the reference plane in which the fruit is held. The cut end of the fruit is then slit in a direction normal to the cut end and in the reference plane in which the fruit is held. Here, again, the slit is of small dimension, perhaps another one-quarter inch. The slit edges of the fruit are spread apart, substantially equal distances on opposite sides of the reference plane. This leaves a substantially inverted, V-shaped notch in the fruit bottom, so that the cut end of the fruit is divided into two sections, each of which can be grasped. The peel will then be slit along either side throughout its full length in continuation of the slits which were originally made. The slitting will be done wholly within the reference plane in which the fruit is held. This will leave the fruit with the peel cut into two sections along its full length, in the reference plane, and with the cut end having its two sections spread outwardly for easy gripping. This concludes the preparation of the fruit for the actual peeling.

The spread ends of the fruit can be grasped, which will provide a hold on each of the two severed sections of the peel. As soon as the peel is grasped, the fruit may be released as it is no longer necessary to hold it in the precise plane. The gripped ends will be moved outwardly, away from the reference plane to strip the peel from the edible portion of the fruit. It may be necessary in some instances to provide for holding the edible portion against movement laterally of the reference plane to prevent the edible portion from following one section of the peel. As the peel of a banana is readily separated from the edible portion, the peel will usually be stripped back quite easily. The whole fruit will then be free for handling in whatever manner may be desired.

Figure 1:
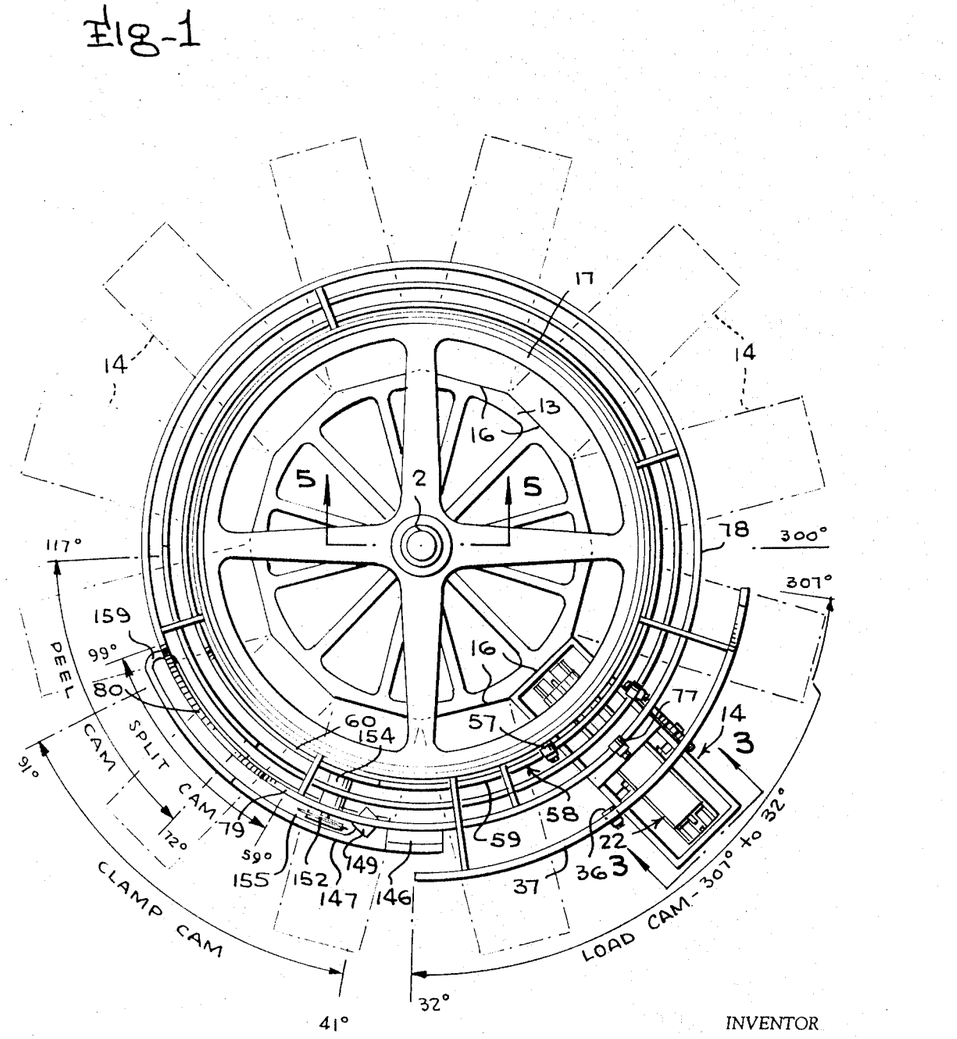
FIGURE 1 is a top plan view of a machine embodying the principles of the present invention, the arcuate extent of the several operative movements of the rotating turret of the machine being shown diagrammatically thereon.
Figure 2:
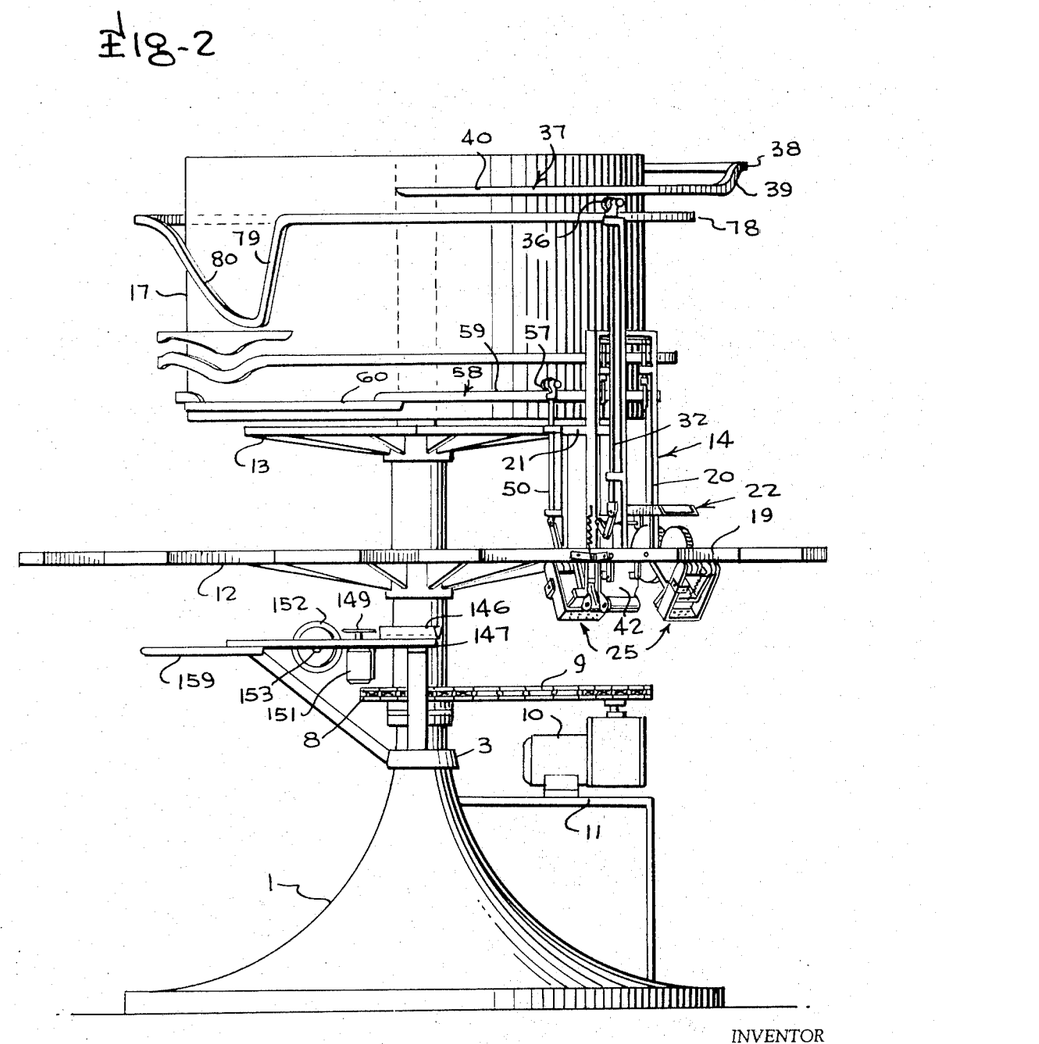
FIGURE 2 is a side elevation of the machine shown in FIGURE 1.
Figure 3:
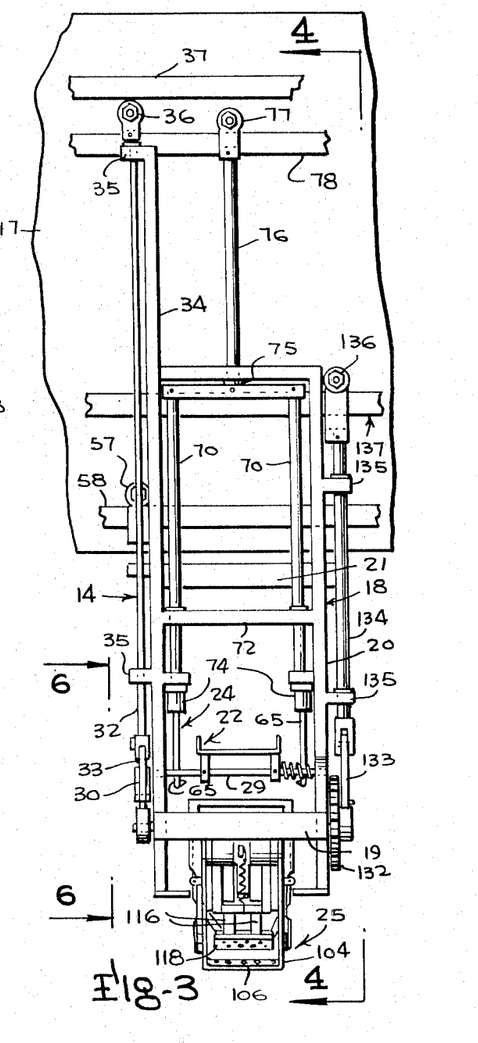
FIGURE 3 is an enlarged fragmentary view of the machine, illustrating in front elevation one of the operative heads of the machine.
Figure 4:
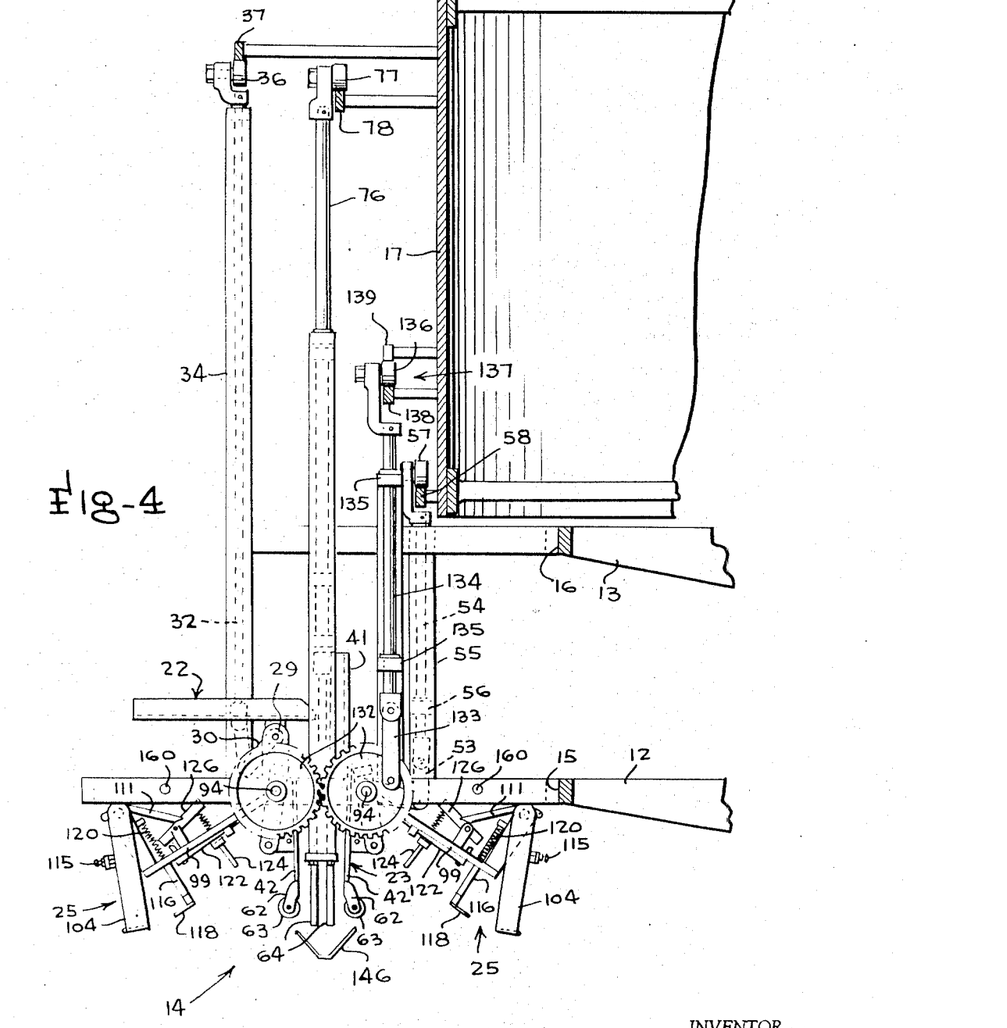
FIGURE 4 is a vertical section taken on the line 4—4 of FIGURE 3, illustrating in side elevation the peeling head shown in FIGURE 3.
Figure 5:
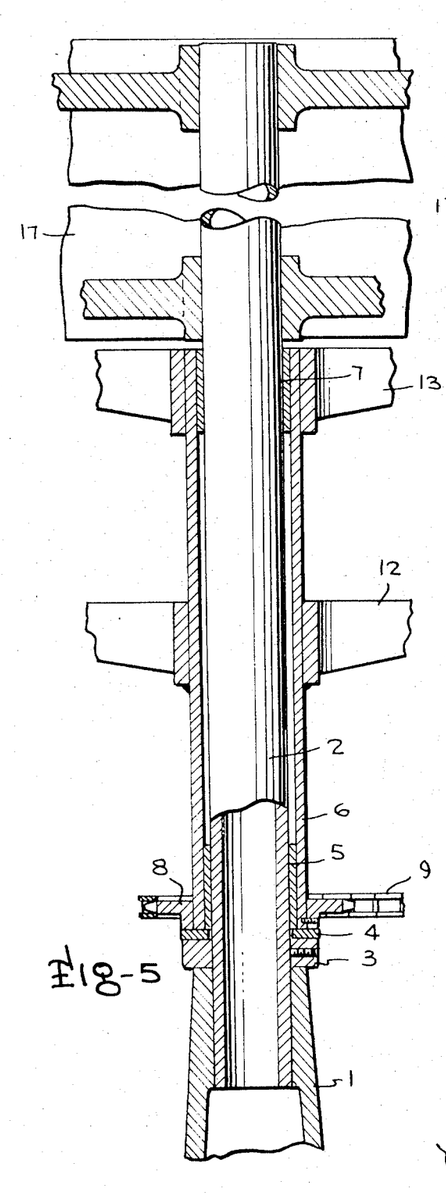
FIGURE 5 is a vertical section through the supporting and rotating elements of the machine, parts being broken away, and is taken substantially on the line 5—5 of FIGURE 1.
Figures 7, 8:
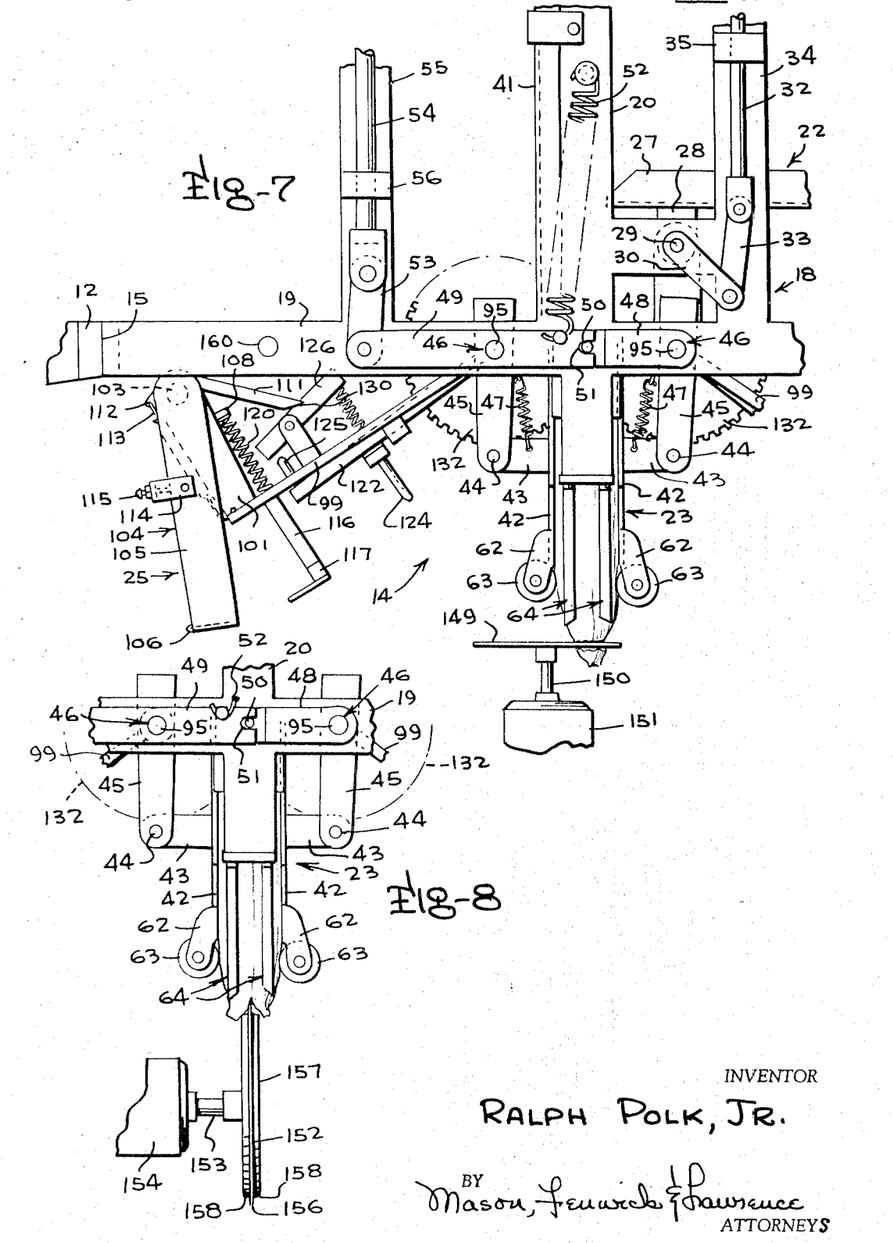
FIGURE 7 is a view of the peeler head as it passes the knife which cuts the end from the fruit.
FIGURE 8 is a similar view of the central portion of the head in position above the knife which splits and spreads the previously cut end of the fruit.
Figure 9:
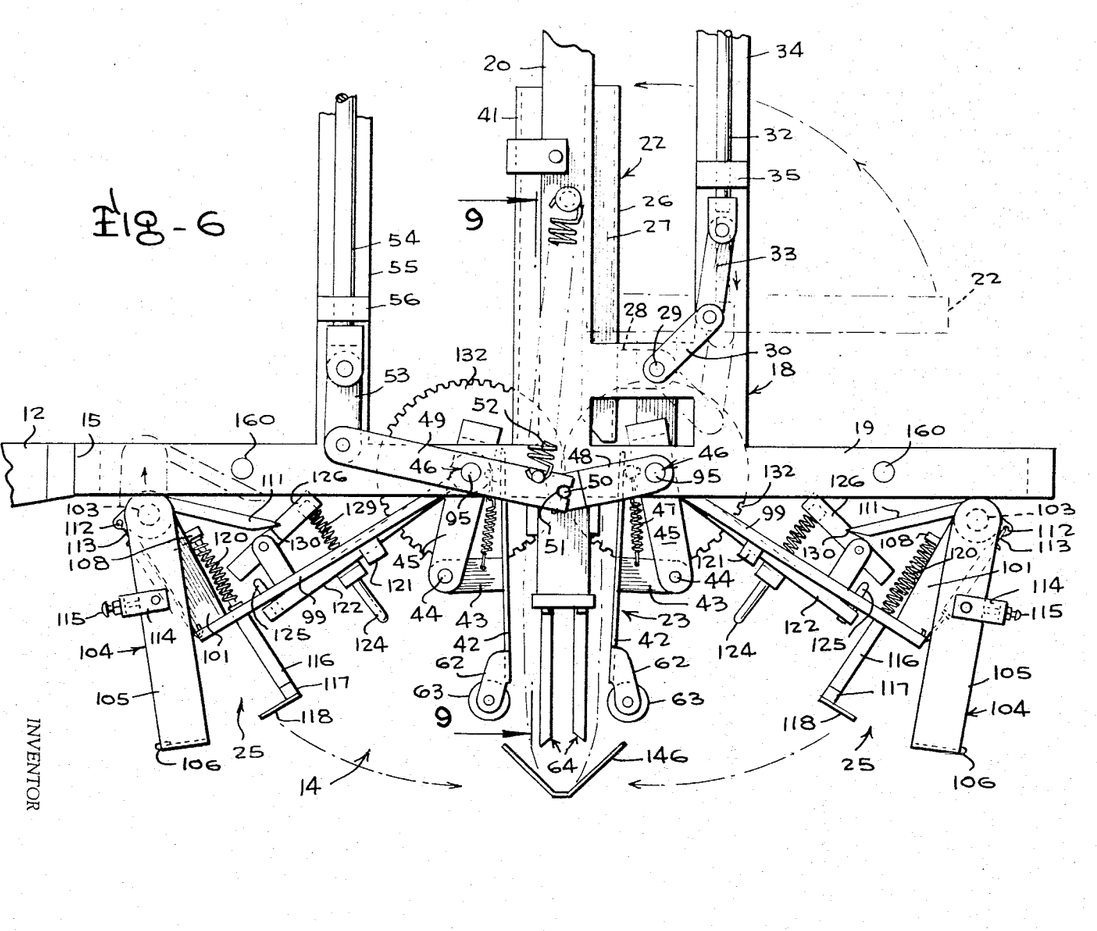
FIGURE 9 is a vertical section taken on the line 9—9 of FIGURE 6, showing the peel slitting knives and their operating mechanism, the knives being in operative, peel-slitting position.
Figures 9, 11, 12:
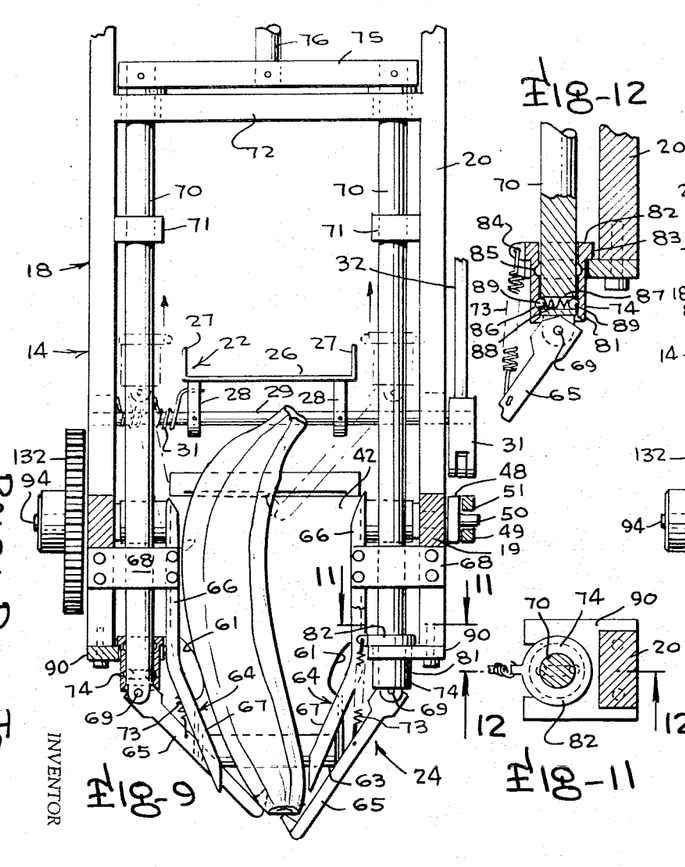
FIGURE 11 is a detail section taken on the line 11—11 of FIGURE 9.
FIGURE 12 is a vertical section taken on the line 12—12 of FIGURE 11, illustrating the construction of the knife control rod and the knife locking sleeve.
Figure 10:
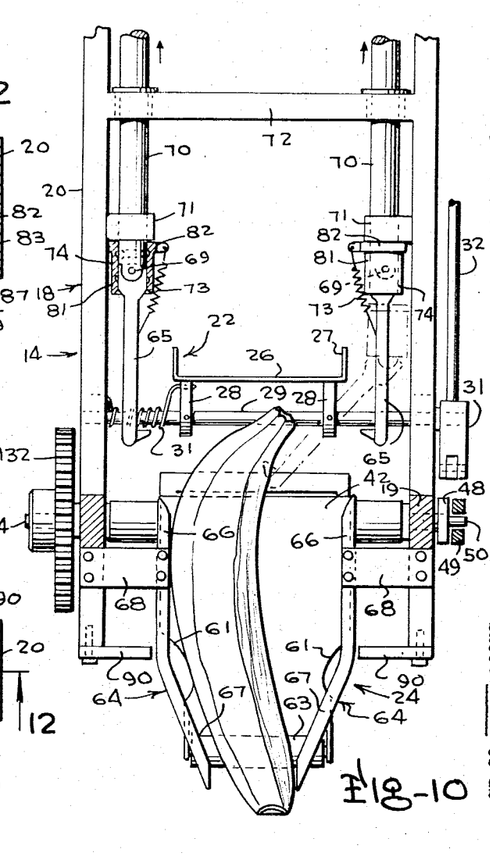
FIGURE 10 is a view similar to FIGURE 9 with the slitting knives in their raised, inoperative positions.

The drawings show a machine which will automatically carry out the above described method. Referring to FIGURES 1, 2 and 5, it will be seen that the machine has been illustrated as supported upon a pedestal type base 1. The base carries a vertical post 2, which projects vertically upward from the center of the base, on which the various parts of the machine are mounted. Post 2 carries a collar 3 seated on the top of the base pedestal 1. A bushing 5 surrounds the post just above the thrust bearing to provide a bearing for a rotatable sleeve 6 which is supported at its top by means of a second bushing 7 mounted on the post 2. The sleeve carries a sprocket 8 which is driven by chain 9 from a suitable power source 10, mounted on a platform 11 supported on the base 1. Sleeve 6 carries a pair of vertically spaced spiders 12 and 13, upon which are mounted a plurality of peeling heads 14. The spiders have polygonal shapes, and their sides 15 and 16 form bases against which the frames of the peeling heads are seated and mounted. The spiders and the peeling heads combine to form a rotating turret which can move sequentially to a plurality of stations where the various steps of the above described method are carried out. Although the movement of the turret will be described as continuous, it could have a step-by-step motion and accomplish the same results. Above the top of the upper spider 13, there is a cam cylinder 17 fixed to the upright supporting post 2.

It is to be noted that only one peeling head 14 has been shown in FIGURES 1 and 2, but the machine is designated to carry a plurality of heads as indicated by the dotted line head positions shown in FIGURE 1.

While the peeler heads 14 may have their various mechanisms supported upon any suitable frame, a frame 18 has been shown which has a rectangular, horizontally positioned base portion 19, an upstanding inverted U-shaped yoke 20, projecting vertically substantially centrally of the base 19, and an upper horizontally positioned U-shaped section 21 projecting rearwardly from the yoke 20. The rectangular base section 19 is attached to one side 15 of the spider 12, while the upper section 21 is connected to one side 16 of the lower spider 13. These three sections are the basic elements of the peeling head frame.

Referring particularly to FIGURES 4 and 6 to 16, it will be seen that the peeler head frame carriers a plurality of operating mechanisms including a fruit receiving tray 22, a fruit positioning and clamping assembly 23, a pair of peel slitting knives 24, and a pair of peel gripping and stripping arms 25. Each of these mechanisms is controlled by one of the cams on the cam cylinder 17 as the peeling head follows its orbital path during the rotation of the turret.

Fruit receiving tray 22 has a flat platform 26 with upstanding sides 27 extending along the full length of the platform, and legs 28 which depend from the platform and are fixed to a shaft 29. The shaft is journaled in extensions of the frame 18, and carries an operating arm 30 at one side. Obviously, movement of arm 30 will cause the tray to tilt about the axis of the shaft 29. A spring 31, which is connected to the frame and to the tray, biases the tray towards a vertical position, and the tray is moved from a vertical to a horizontal position by means of a control rod 32, connected to the operating arm 30 by means of a link 33. Rod 32 extends vertically along an upright extension 34 of the frame 18 having spaced ears 35 in which the rod 32 is slidably mounted. The upper end of rod 32 carries a cam follower roller 36 to ride upon the underside of a loading cam 37 on the cylinder 17. Cam 37 has an upper section 38, which is above the position of roller 36 when the operating rod is in its released, raised position, a downwardly inclined tray tilting section 39, and a horizontal lower section 40. The lower section is at such height that it will hold the operating rod 32 depressed to maintain the tray horizontally during the loading operation. As soon as the roller 36 rides from beneath the lower section 40, the spring 31 tilts the tray to vertical position and permits the banana to slide from the tray into the positioning and clamping assembly 23.

When tray 22 tilts to its vertical position, it comes into substantial parallelism with a fixed vertical plate 41 mounted on the upstanding yoke 20 of frame 18. Platform 26 of the tray and the plate 41 will be spaced apart a distance slightly greater than the thickness of a large banana, to allow a banana to slide freely between them while maintaining the curvature of the banana in a vertical plane parallel to the fixed plate 41. The banana, of course, when placed upon tray 22 will automatically assume a position with its curved length parallel to the tray platform. When the tray is tilted to its vertical position the banana will automatically be in position to pass between the tray platform and plate 41 while maintaining the curvature in a vertical plane passing between the tray platform and the fixed plate.

As the banana moves downwardly, it passes between movable clamping and positioning jaws 42. Each jaw 42 has arms 43 projecting from its back near its opposite edges, and these arms are pivotally connected at 44 to the bottom ends of levers 45. Levers 45 are fixed to shafts 46 which are mounted for rotation in the rectangular base portion 19 of the peeling head frame. Coil springs 47 are connected between the arms 43 and the levers 45 adjacent shafts 46, to bias the clamping jaws 42 so that their upper ends will tend to diverge and permit free entry of the fruit between them as it drops from the passage formed by the fixed plate 41 and vertically positioned tray 22. Shafts 46 are rotated to move the jaws 42 to and from clamping position by means of levers 48 and 49 fixed to the respective shafts 46. Lever 48 is relatively short and is connected to the forward shaft 46. This lever carries a pin 50 near its free end. Lever 49 is a much longer lever, and is connected to the rear shaft 46 at a point intermediate the ends of the lever. The forwardly projecting end of lever 49 has a recess 51 to receive the pin 50 on lever 48. The interfitting of pin 50 and recess 51 causes the levers 48 and 49 to move in unison, with any motion given to one being transferred to the other. The levers 48 and 49 are urged upwardly to bring the jaws 42 into clamping relation with a banana by means of coil spring 52 which is connected to the lever 49 and the vertical yoke 20 of the peeling head frame 18. Whenever the arms 48 and 49 are free to move, spring 53 will draw them upwardly and thereby move the clamping jaws toward one another to yieldingly engage opposite sides of the fruit. The rear end of lever 49 projects beyond the shaft 46 to which it is connected, and has its end connected to a link 43 which, in turn, is connected to an operating rod 54. This rod extends vertically along an extension 55 of the peeling head frame, and has ears 56 in which the rod 54 is slidably mounted. Rod 54 carries a roller 57 at its upper end to follow a clamp actuating cam 58 on the cam cylinder 17. Cam 58 has an upper level 59 and a lower level 60. When roller 57 is on the upper level the rod 54 is raised and the lever 49 is rotated in a clockwise direction (as viewed in FIGURE 6) which will elongate spring 52 and cause the jaws 42 to move apart. When the roller moves off of the upper level, the spring 52 is free to exert its force to draw the jaws 42 into yielding clamping relation with the fruit. As the jaws move in equal increments, the fruit will be maintained in a predetermined vertical plane. The fruit, irrespective of its size, will always be held on this plane.

The lower side portions of the clamping jaws 42 are cut away, as at 61, for a purpose which will be described later. Also, the lower ends of the jaws have outwardly extending arms 62 to support rollers 63 which facilitate the removal of the peel, as will be later described.

Slitting knives 24 are arranged on either side of the peeling head frame so as to slit bananas held between the jaws 42 vertically along the reference plane in which the banana is held. As the bananas are always held centered on this plane, the slitting knives will function to slit the peel centrally along the convex side of the fruit and centrally along the concave side of the fruit. The slitting assembly includes fixed guides 64, which hold the banana against movement in the reference plane, and the movable knives 65. Details of the peel slitting mechanism can be seen best in FIGURES 6, 9 through 12, and 15.

There are four fixed guides 64, arranged in oppositely disposed pairs, with the guides of each pair being equally spaced on opposite sides of the reference plane. The guides have upper vertical sections 66, and lower inclined sections 67, with the inclined sections of the oppositely disposed pairs of guides converging downwardly (see FIGURE 10). The guides are held in position by means of plates 68 attached to the upper sections of the guides and to opposite sides of the legs of the upstanding yoke 20. The guides occupy positions between the clamping jaws 42. It will be seen from FIGURES 9 and 10 that the fruit clamped between the jaws 42 will be resting against one pair of guides 64, depending upon whether the convexity of the fruit is positioned to the right or to the left.

The knives 65 are designed to move between the respective pairs of guides 64 during their slitting movement. Each knife 65 is pivotally connected, as at 69, to the bottom of a mounting rod 70. The rods are mounted for vertical sliding movement in ears 71 and cross brace 72 on the vertical legs of the upstanding yoke 20 of the peeling head frame. The knives are biased inwardly toward the fruit by means of coil springs 73 which are connected to the knives and to sliding sleeves 74 which serve to lock the knives in alignment with the rods 70 at certain times, as will be explained. Rods 70 are interconnected at their tops by means of a cross member 75, and a control rod 76 is connected to the center of the cross member and projects upwardly. At the top of the control rod there is a cam roller 77 which rides upon a slitting cam 78 (see FIGURES 1, 2, 3 and 17) which is mounted upon the cam cylinder 17. The cam extends entirely around the cylinder, and has a drop 79, which permits the knives to move to their lowermost position, and an incline 80, which controls the upward movement of the knives as they perform their slitting operation. At the end of the slitting stroke the knives will be brought into vertical alignment with the rods 70 and locked in that position by means of the sleeves 74.

Sleeves 74 have a cylindrical body 81 and an enlarged head 82, which provide a shoulder 83 beneath the head at the juncture of the head and body. There is an ear 84 projecting from the head for connection to the coil springs which bias the knives to their cutting positions. The interior of the body has upper ball-receiving recesses 85 and lower ball-receiving recesses 86. The lower end of the mounting rod 70 has a transverse bore 87 which houses a coil spring 88, at the ends of which are balls 89. The spring 88 urges the balls in opposite directions for seating engagement in the recesses 85 and 86. When the rod is raised to its uppermost position, the head of the sleeve 74 will strike ear 71 on the frame and be held against further movement. As the rod has a short distance to travel beyond this point, the sleeve will be forced downwardly into surrounding relation with the lower end of the rod and the upper end of the knife so as to lock the knife in vertical alignment with the rod. At this time, the balls 89 will be in the upper recess 85 of the sleeve. When the rods move downwardly, the shoulder 83 of the sleeve will strike a bifurcated plate 90 fixed to the lower end of the upstanding yoke 20 of the frame. This will stop the downward movement of the sleeve and, as the rod continues downwardly, the upper end of the knife and the pivotal connection between the knife and rod will be exposed so that the knife can move inwardly under the influence of spring 73 into contact with the fruit. At this time, the balls 89 will be seated in the lower recesses 86 of the sleeve.

Figure 16:
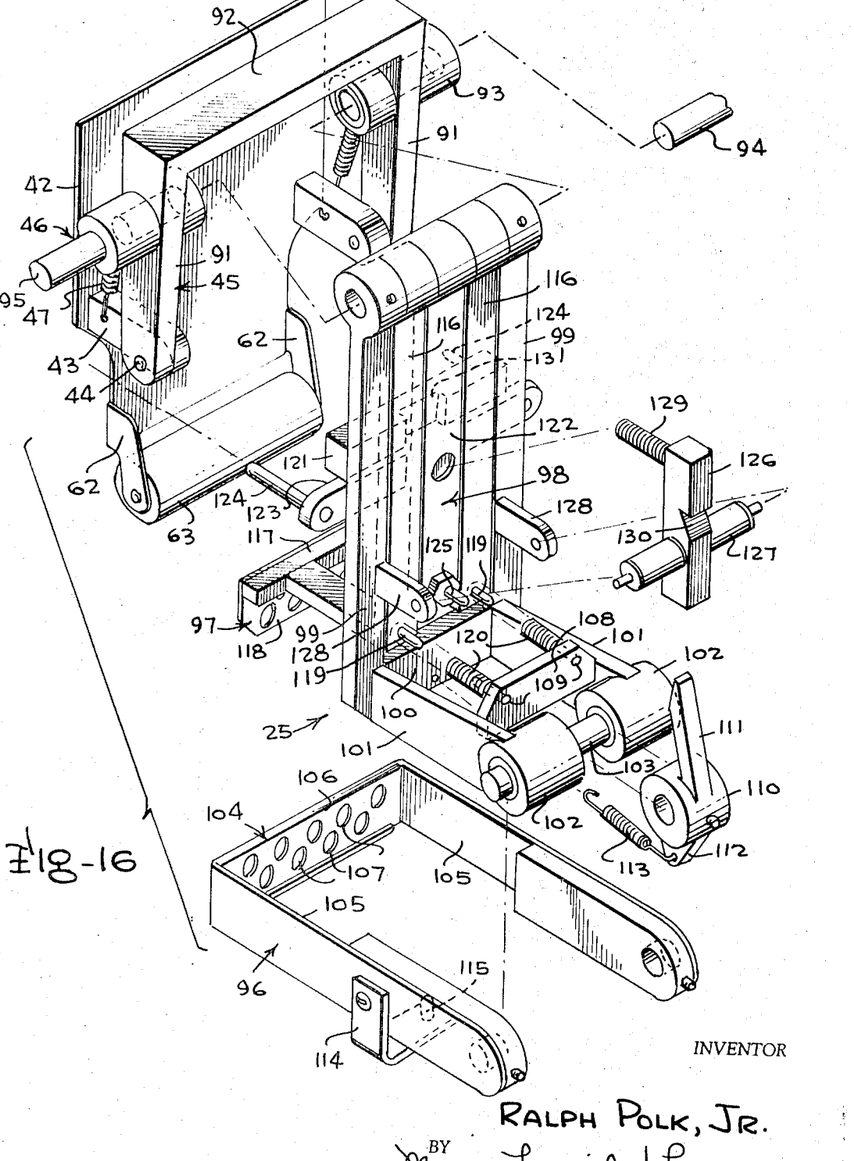
FIGURE 16 is an exploded perspective view of one of the fruit clamp members and associated peel gripping and stripping members.
Figure 17:
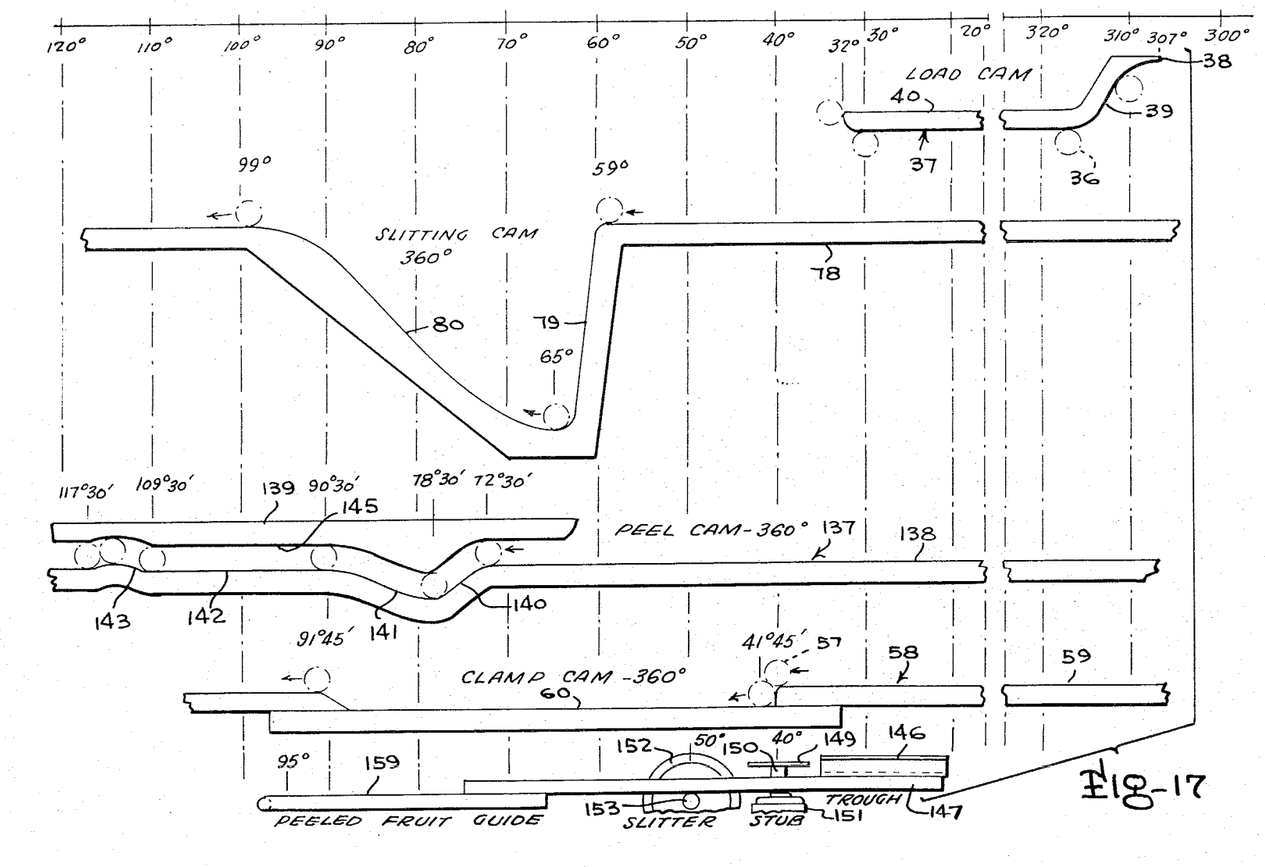
FIGURE 17 is a diagrammatic illustration of the control cams for operating the various mechanisms of the machine.

Shafts 46 which support the clamping jaws 42 also serve to support the peel gripping and stripping arms 25. To this end, the shafts 46 are made in two parts. Referring particularly to FIGURE 16, it will be seen that the levers 45 which support the clamping jaws are formed as yokes, each having legs 91 and a bridge 92. The legs have hubs 93 to receive mounting shafts 94 for the peel grippers, with the yokes being free to rotate on the shafts. Shafts 94 terminate within one of the hubs 93, and a stub shaft 95 projects from the hub to complete the assembly. The yokes are fixed to the stub shafts 95, and these shafts also carry the levers 48 and 49 which control the movement of the clamping jaws. With this arrangement, the shafts 94 are free to rotate irrespective of movement of the levers 45, and the levers 45 are free to rotate irrespective of movement of shafts 94.

The peel gripping and stripping arms are best seen in FIGURES 13 through 16. This assembly consists of three primary elements, a peel engaging jaw 96, a peel clamping jaw 97 and a latch and latch tripping mechanism 98.

Peel engaging jaws 96 are mounted upon a frame having a pair of laterally spaced, upstanding legs 99 which are fixed to the shafts 94. Legs 99 are joined at the bottom by a cross member 100. Arms 101 extend rearwardly from the bottoms of legs 99, and terminate in bosses 102. A shaft 103 extends freely through the bosses 102. The actual peel engaging jaw is a U-shaped member 104 which has legs 105 mounted on shaft 103, and fixed to it. The legs are joined by a peel engaging member 106, which is in the form of a flat plate having a plurality of openings 107 to permit banana pulp to pass through the member. An abutment plate 108, between the arms 101 carries spring mounting pins 109, the purpose of which will be later described. A control member for the jaw 104 is also mounted on shaft 103. The control member has a hub 110 which fits on shaft 103 between the bosses 102, and carries a control arm 111. It will be seen that movement of arm 111 will rock shaft 103, causing jaw 104 to swing vertically. There is a lower arm 112 on hub 110, which is connected to one end of a spring 113. The other end of the spring is connected to the bottom cross member 100. The spring biases the control member so that the peel engaging jaw will be yieldingly urged to its upper position. The upward movement of the jaw is limited by means of a stop 114 mounted on one of the legs 105 of the peel engaging member 104. The stop carries an adjustable groove 115 which is positioned to strike the underside of one of the arms 101 of the frame of the peel engaging member. Spring 113 will normally hold the jaw in position with screw 115 bearing against the arm 101.

The peel clamping jaw 97 is mounted upon a pair of L-shaped arms 116. These arms are freely mounted on the shaft 94 so as to be freely swingable. The forward ends of the bottom sections of the arms 116 are bridged by a cross head 117, which carries the clamping jaw proper 118. On the rear side of the vertical sections of the arms 118, near the bottom, there are spring mounting pins 119, which support one end of springs 120. The opposite ends of the springs are on the pins 109 on abutment 108 of the peel engaging jaw frame. The springs exert a forward pressure against the arms 116 to move the jaw 118 outwardly. This motion is limited, however, by a cross brace 121 which is mounted upon, and spans the space between, the upstanding legs 99 of the peel engaging jaw frame. When the arms 116 of the peel clamping jaw assembly are in their foremost position, abutting the brace 121, they are in the plane of the vertical arms 99 of the peel engaging jaw frame. The arms are free to swing backwardly, however, and compress springs 120, when pressure is exerted against the clamping jaw 118.

The latch tripping mechanism consists in a single vertical member 122, freely mounted on the shaft 94. This member carries a cross arm 123, which projects equal distances on opposite sides of the vertical member. The cross arm is offset from the vertical member such distance as to allow the cross arm to be in contact with the forward faces of the upstanding frame members 99 when the vertical member is lying in the plane of the leg members 99. Feeler pins 124 are mounted on the ends of the cross arm to project through the notched areas 61 at the sides of the clamping jaws 42 for contact with the fixed guides 64 of the slitting mechanism. This contact occurs when the entire assembly 25 is moved forwardly into peel engaging position. At the bottom of the vertical member 122 there is a latched tripping member 125. This member is adjustable so as to determine the precise position of the latch trip.

There is a latch 126 for holding the control arm 111 of the peel engaging jaw assembly in latched position with the peel engaging jaw in its downward, inoperative position. The latch has a central pivot 127 mounted in ears 128 at the backs of the upstanding legs 99 of the peel engaging jaw frame. A spring 129 is positioned between the upper end of the latch body and the vertical member 122 of the trip mechanism to urge the latch into control arm engaging position. The latch body has a notch 130 to engage, and hold, the control arm 111. When the trip member is moved rearwardly by contact of feeler pins 124 with the fixed guides 64, the latch trip 125 will strike the lower end of latch 126 and rock it about its pivot to release the control arm. The peel engaging jaw 104 will then swing upwardly under the urging of spring 109 until the stop screw 115 strikes the underside of the frame. When the control arm is in latched position, the spring 129 presses the vertical member 122 of the latch trip forwardly into a notch 131 in the cross brace 21. This limits the forward motion of the trip member and positions it for its normal operation.

It will be understood that there are two of the peel engaging assemblies on each peeling head, the assemblies being mounted equidistant from opposite sides of the reference plan in which the banana is positioned. The two assemblies are caused to move toward and away from the reference plane in unison by means of spur gears 132 fixed to the shafts 94. One gear has a link 133 connected to it, and this link is pivotally connected to the lower end of a control rod 134. This rod is vertically slidable in gears 135 mounted on the upstanding yoke 20 of the peeler head frame. A cam follower roller 136 is mounted at the top of the control rod and rides along a peeling cam 137. The cam has a lower track member 138 which has its upper guiding surface horizontal for the greater portion of its length. At the point where the arms are to move inwardly into peel engaging position, the surface 139 declines, as at 140, then rises, as at 141, to bring the stripping jaws back to their initial position. The cam then extends horizontally for a short distance, as at 142, then arches upwardly and downwardly again as at 143, to release the peel and recock the peel engaging jaw 104. There is a short upper cam track 144, which extends over the lower one along the region of the operative contour of the lower cam to confine the roller to follow the lower cam surface. The undersurface 145 of the upper cam 144 has a similar contour to the upper surface of the lower cam so as to provide a path of constant width along the operative area of the cam.

As previously mentioned, the peeler heads 14 travel in an orbital path about the axis of the vertical central post 2. During this orbit, as the heads approach the area where the fruit receiving tray 22 will tilt to drop the fruit between the clamping jaws 42, the head passes over a V-shaped trough 146, mounted on an arcuate support 147 held in position by arms 148 rising from the machine base. The trough 146 has its vertical center positioned in the reference plane in which the banana is to be clamped and the lower end of the banana will drop into the trough as it falls between the clamping jaws and be accurately positioned by the trough. After positioning, the clamps will operate to fix the banana in its proper position.

The arcuate support 147 also carries a rotary knife 149 for cutting the bottom end from the banana and exposing the end of the edible portion of the fruit. The knife is mounted to one side of the reference plane when the peeling head is above the knife, and is mounted upon a shaft 150 driven by a motor 151 located on the underside of the arcuate support 147.

A third member, an end slitting knife 152, is also carried by the support 147. This knife is mounted below the support on a shaft 153 driven by a motor 154. Knife 152 projects upwardly through a slot 155 in the arcuate support 147. The knife consists of a circular blade 156 which projects annularly beyond a widened body 157. The widened body forms shoulders 158 which projects outwardly from the knife blade. This will allow the blade to slit the cut end of the banana in the reference plane, while the shoulders 158 will enter the slit and spread the ends of the banana. This will position the bottom ends of the peel for gripping by the gripping jaws.

There is a banana guide, in the form of spaced curved rods 159 fixed to the end of the arcuate support 147. This provides means through which the banana can drop after being released by the clamping jaws, and which will prevent side movement of the banana due to the pull of either of the peel stripping jaws. This will be described more in detail.

In using the machine, the motor 10 will be started to begin rotation of the turret and movement of the peeling heads in their orbital path. At the same time, motors 151 and 154 will be started to begin operation of the end severing knife and the slitting and spreading element. As a particular peeling head moves along its path the roller 36 at the end of the platform control rod 32 will contact the underside of the leading edge of the load cam 37 (see FIGS. 1 and 17). This will cause the control rod to be depressed and rotate the tray 22 about its pivot to move it to a horizontal, fruit receiving position. This will increase the torsion in spring 31. While the tray is moving along the section embraced by the loading cam, a banana will be placed upon it. This can be done automatically, or manually. It will be noted from FIGURE 1 that the loading cam ends within the arcuate extent of the positioning trough 146. Therefore, as the peeling head moves over the trough 146 the roller 36 will pass from beneath cam 37 and spring 31 will tilt the tray to a vertical position. When the tray is in this position it forms a passageway with the fixed vertical plate 41 and, as the banana was lying flat on the tray, it will be held in this position when the tray tilts. This will cause the banana to drop between the clamping jaws 42 while maintaining the position with its curvature lying substantially within a vertical reference plane. The bottom of the banana will drop into the V-shaped trough 146 to accurately position the bottom in the preselected plane. At this time, the roller 57 on the operating rod 54 of the clamping mechanism will move from the upper level 59 of the clamping cam 58 to the lower level 60. This releases the clamping arms so that the spring 52 can operate levers 45 to swing the clamping jaws into engagement with the fruit. As the clamping jaws are under spring operation, they will move into contact with the fruit sides irrespective of the size of the fruit. The movement of the jaws is equal so that the entire fruit will be held flat and accurately centered on the reference plane. When the jaws have clamped the fruit in position, the fruit will move off of the trough 146 and into the rotary knife 149 so that the bottom end of the fruit will be cut off. Continued movement of the peeling head will bring the bottom of the banana into contact with the slitting knife 152 which will slit the bottom end of the banana in the reference plane and the shoulders 148 will spread the split ends of the banana apart. This will leave a substantially V-shaped notch in the bottom of the fruit.

After the peeling head leaves the slitting and spreading position, the roller 77 carried by control rod 76 of the peel slitting knife assembly will ride down the drop 79 on the slitting cam 78. This will lower the mounting rods 70 and the knives 65. As the knives approach their lowermost positions, sleeves 74 will strike the bifurcated plates 90 and be held against further movement. As the rods continue their downward movement they will cause the balls 89 in the sleeve to move inwardly and the rod will move down through the sleeve to the lower position where the balls will spring out into the recesses 86. At this time, the pivots 69 between the knives and mounting rods will be below the sleeves and the knives will be free to move inwardly under the influence of springs 73. The inward movement of the knives will continue until the knife ends contact the fruit. Almost as soon as the knives reach their lowermost position, the roller 77 will begin to move up the incline 80 of cam 78 to lift the mounting rods and knives. This will cause the knives to slit the fruit (see FIG. 9) as they move upwardly. Springs 73 will keep the knives in cutting relation to the peel so that the peel will be slit throughout its entire length. As the mounting rods approach their uppermost positions, sleeves 74 will contact ears 84 and the upward movement of the sleeves will be stopped. The ball catches will release and the rods will continue their upward movement until the balls reach the upper recesses 85. At this time, the mounting rods are at their uppermost position and the knives have been drawn up into the sleeves so as to be locked in vertical alignment with the sleeves (see FIG. 10).

Figure 13:
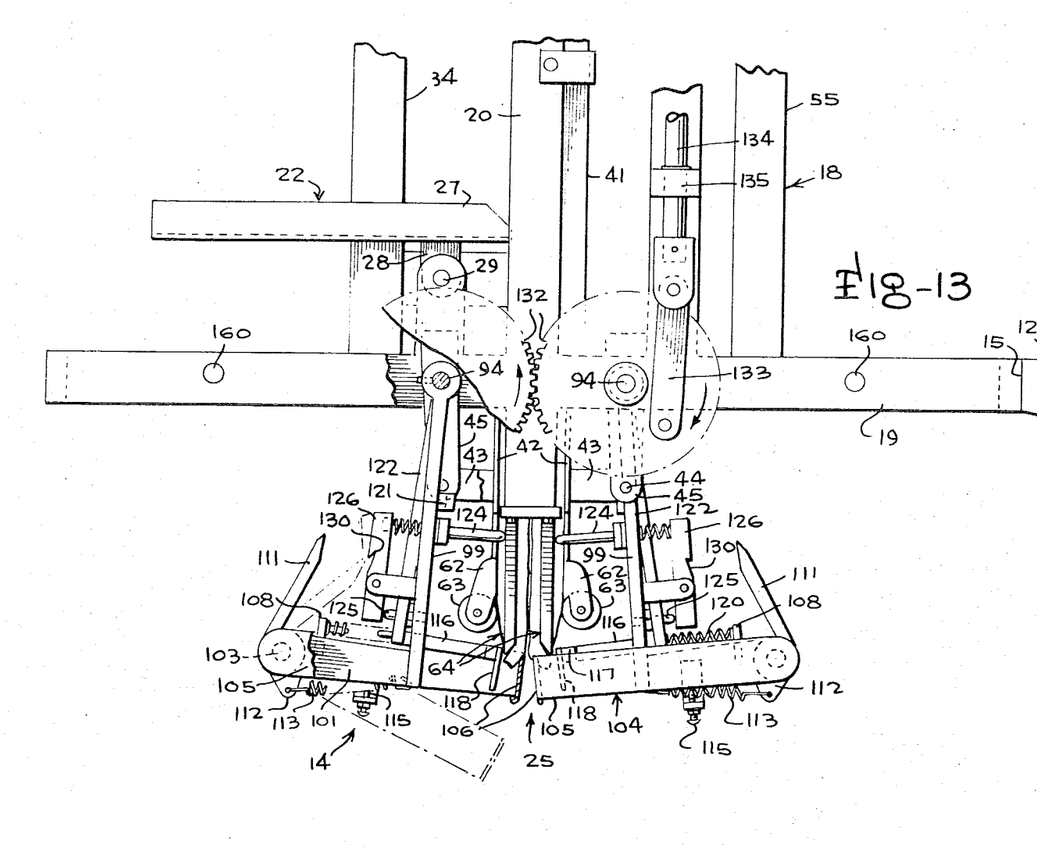
FIGURE 13 is a view similar to FIGURE 6 with the peel gripping members in operative position ready to strip the peel from the fruit.
Figure 14:
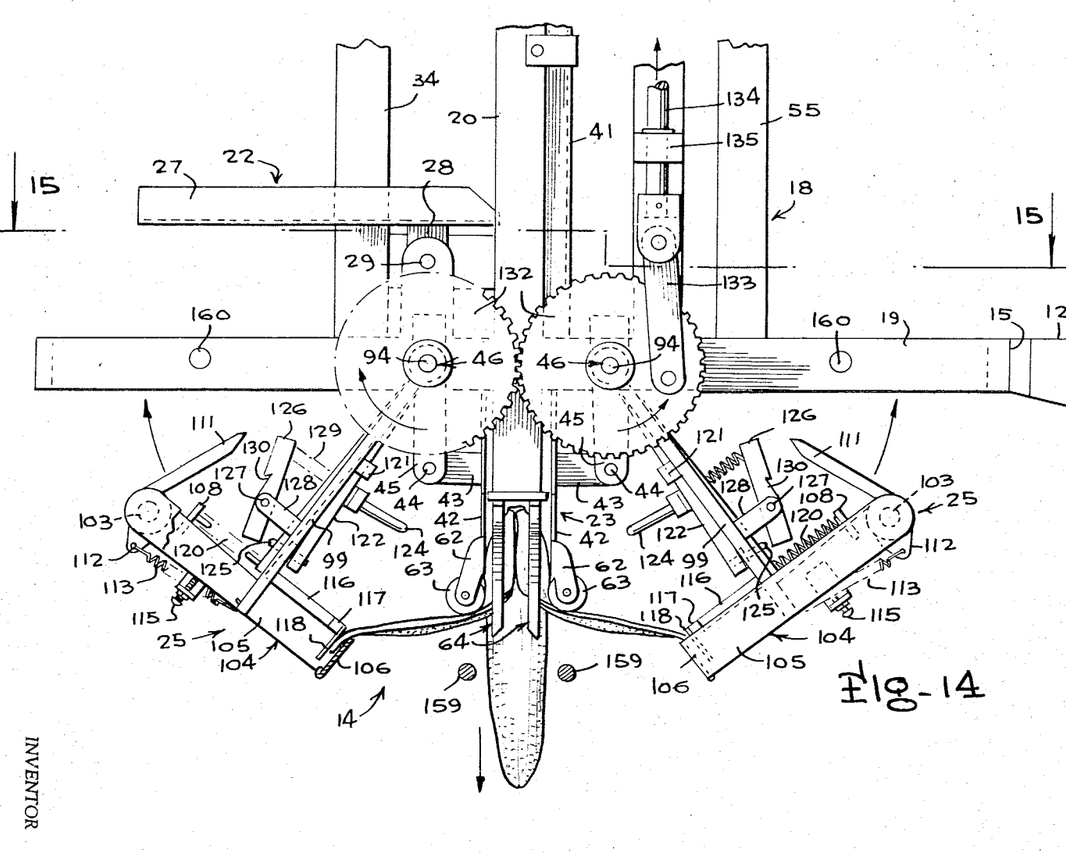
FIGURE 14 is a view similar to FIGURE 13, with the peel gripping members moved outwardly and the fruit partially peeled.
Figure 15:
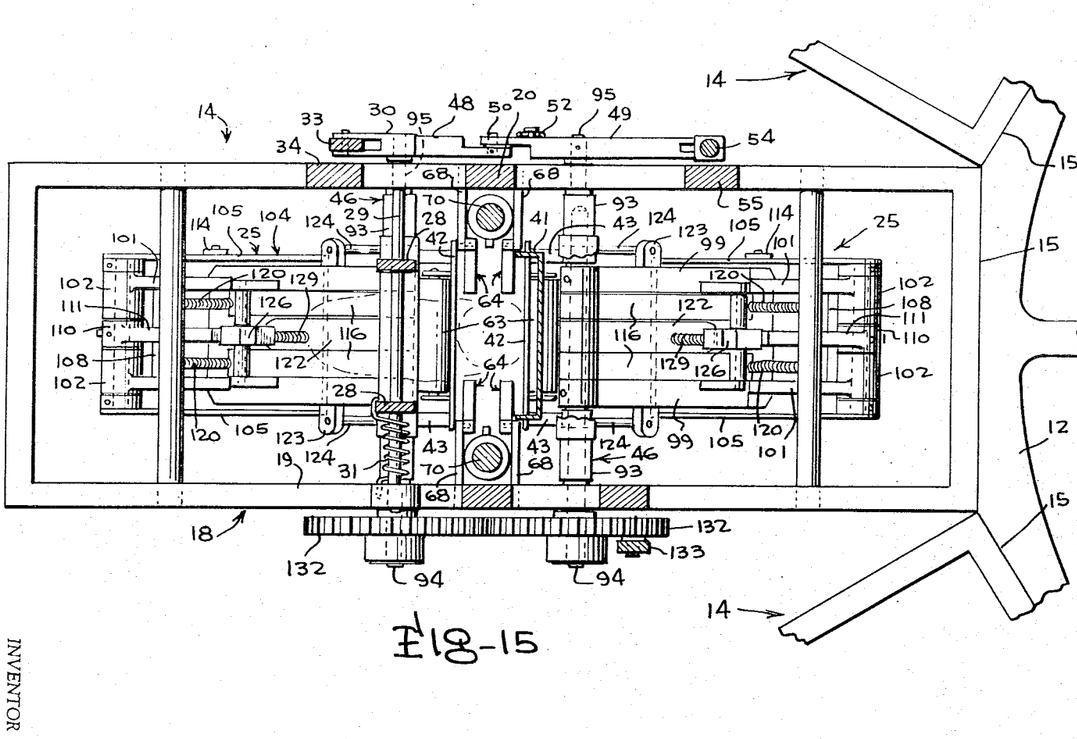
FIGURE 15 is a horizontal section taken on the line 15—15 of FIGURE 14.

At this time, the peel gripping members will be in their inoperative positions as shown in full lines in FIGURE 6. The cam roller at the top of control rod 134 will now be approaching the decline 140 of cam 138. As the roller moves down the decline, the control rod will move downwardly and link 133 will cause the spur gear 132 to which it is attached to start to rotate. Of course, the other spur gear will rotate in equal amount and in an opposite direction. This will cause the jaw assemblies to move in the direction of the arrows in FIGURE 6. When the assemblies have moved far enough for the clamping members 118 of the peel clamping jaws 97 to strike the sides of the fruit, the movement of the clamping jaws will be stopped. Further movement of the assemblies will compress springs 119. Inward movement of the assemblies will stop when the peel engaging members 106 of the engaging jaws 104 are approximately at the reference plane. Just prior to this point, however, the feeler pins 124 will have contacted the fixed guides 64 and the vertical latch member 122 will begin to move toward the plane of the jaw frame. This will cause its trip 125 to approach, and strike, the lower end of latch 126. The latch will rotate about its pivot 127 and release control arm 111 of the peel engaging jaw. This will free the jaws so that springs 113 can swing them sharply to their upper positions. The jaws will move upwardly until their stop screws 115 contact the frame. At this point, the jaws of the two assemblies will be substantially together and within the split end of the banana, as shown in FIGURE 13. As the clamping jaw 97 is already in contact with the outside of the peel, the two jaw members will have the lower end of the peel clamped between them. The roller 136 will now start moving up the rise 141 of cam 138 to reverse the movement of the assemblies. This will cause the jaw assemblies to move away from one another stripping the peel from the edible portion of the fruit. At this time, the roller controlling the clamping plates will move up to the upper level 59 of cam 58 and swing the clamping plates to their release position. This will free the fruit so that it can move downwardly within the guide 159 and be held against side movement under the pull of the peeling jaws. As the jaws move outwardly the peel will ride under rollers 63 and thus cause the fruit to move downwardly. The outward movement of the peeling jaws will continue until the jaws have reached the position they were in at the beginning of their inward movement, that is the position shown in full lines in FIGURE 6. The peel sections will be free from the fruit and hanging from the jaws. After a short interval, the control roller 136 will move up the peel releasing and jaw cocking rise 143 of cam 137 and raise the jaw assemblies to the dotted line position shown in FIGURE 6. This will cause the control arms 111 to strike jaw cocking pins 160 on spiders 12 and move the arms into notches 130 in latches 126 and cock the jaws for the next inward movement. The roller continues along the arcuate cam surfaces and lowers the assemblies to the positions shown in full lines in FIGURE 6 to await the next operation. This completes the cycle of operative movement of the peeling head.

It will be noted that the entire peeling operation takes place in approximately 180° of rotation of the peeling head, leaving about the same degree of rotation before beginning a new cycle. As bananas are rather sticky to handle, the unused portion of the full orbit will be available for washing the operative parts so as to maintain them in proper condition. No washing apparatus has been shown, however.

While in the above the new method of peeling bananas and one practical machine for carrying out that method has been disclosed, it will be understood that the details of structure shown and described are merely by way of illustration, and the invention may take other forms within the scope of the appended claims.

I claim:

1. A method for peeling bananas comprising, positioning a banana with its curved silhouette lying within a predetermined plane and holding the banana in that position, cutting one end from the banana to expose the end of the edible portion of the banana, slitting the peel of the banana along both curved surfaces along the predetermined plane, grasping the split peel segments at the cut off end of the banana and pulling simultaneously in opposite directions to strip the peel from the edible portion of the banana.

2. A method for peeling bananas as claimed in claim 1 including the step of releasing the banana before the peel is stripped off to permit it to move in a direction normal to the pulling direction while restraining it against movement in either direction in which the peel is pulled.

3. A method for peeling bananas as claimed in claim 2 including the step of slitting the cut off end of the banana and spreading the slit ends.

4. A machine for peeling bananas comprising, a peeling head including means to clamp a banana with its curved silhouette lying within a predetermined plane, means to cut one end from a banana clamped in the head, knives to split the peel on opposite sides of a clamped banana along the curved surfaces of the banana along the predetermined plane, means to cause the splitting knives to traverse the length of a clamped banana, peel-gripping members to grip the split peel segments on opposite sides of the banana at the cut off end, and means to cause the peel-gripping members to move away from the banana to strip the peel from the banana.

5. A machine for peeling bananas as claimed in claim 4 wherein, there is a banana-receiving tray mounted for movement to a horizontal position to receive a banana with its curved contour flat upon the tray, and for movement to a position to transfer the banana to the clamping means.

6. A machine for peeling bananas as claimed in claim 5 wherein, there is means for splitting the cut off end of a clamped banana in the predetermined plane and spreading the split end to either side of the predetermined plane.

7. A machine for peeling bananas as claimed in claim 5 wherein the clamping means comprises a pair of spaced plates, positive means to move the plates away from one another, and means to yieldingly urge the plates toward one another in banana-clamping position when the positive separating means is released.

8. A machine for peeling bananas as claimed in claim 4 wherein, the splitting knives comprise, mounting members movable in the direction of the length of a banana clamped in the peeling head, knives pivotally connected to the mounting members for swinging movement in the predetermined plane, means to yieldingly urge the knives to peel-slitting position and to follow the contour of a clamped banana, and means to move the mounting members to cause the knives to traverse the length of a clamped banana.

9. A machine for peeling bananas as claimed in claim 8 wherein there are means to lock the knives in positions away from a clamped banana, and means to release the knives to the action of the yielding means.

10. A machine for peeling bananas as claimed in claim 5 wherein, the means to grip the split peel segments of a clamped banana comprise a pair of gripping assemblies movable simultaneously to and from a clamped banana, each assembly comprising, a frame, a clamping jaw on the frame to contact the outside peel of a clamped banana as the assembly is moved toward a clamped banana, a peel-engaging jaw movable into the split end of a clamped banana when the clamping jaw is in contact with the peel, and means to urge the peel-engaging jaw and clamping jaw together to clamp the split peel segment between them.

11. A machine for peeling bananas as claimed in claim 10 wherein, the peel-engaging jaw has an operative position in parallelism with the clamping jaw and an inoperative position removed from parallelism with the clamping jaw, means yieldingly urging the peel-engaging jaw to operative position, means to releasably hold the peel-engaging jaw in inoperative position, and means to release the peel-engaging jaw when the peel-engaging jaw is in position to move into the split end of the banana.

12. A machine for peeling bananas as claimed in claim 11 wherein there are means operable as the assembly moves away from the banana clamping position to move the peel-engaging jaw to inoperative position to release a peel segment held between the jaws and to reset the peel-engaging jaw in inoperative position.

13. In a machine for peeling bananas, a tray upon which bananas may lie with their curved silhouette parallel to the tray, the tray being pivotally mounted for tilting movement from a horizontal banana-receiving position to a vertical banana-dumping position, a V-shaped trough positioned below the tray with its V-shaped bottom parallel to the pivot axis of the tray to receive bananas dumped from the tray and position the bottom end of the banana in a vertical plane bisecting the V-shape of the trough, clamping members positioned above the trough equidistant on opposite sides of the vertical plane, and means to move the clamping members into yielding engagement with a banana in the trough to hold the banana centered on the vertical plane with the curved silhouette of the banana lying parallel to the vertical plane.

14. In a machine for peeling bananas as claimed in claim 13 wherein, there is a vertical wall spaced from the tray and parallel to the tray when in vertical tilted position to form with the tray a chute emptying between the clamping members and centered over the V-shaped trough.

15. A machine for peeling bananas comprising, a base, a turret rotatably mounted on the base, a plurality of peeling heads carried by the turret, each of the peeling heads including, means to receive and hold bananas in predetermined position, means to slit the peel of bananas along the full lengths of the longitudinally curved surfaces of the banana, and means to engage and strip the slit peel from bananas, a banana end-removing means carried by the base, a banana end-splitting and end-spreading means carried by the base, means carried by the base to control the operating means included in the peeling heads, and means to rotate the turret to carry the peeling heads sequentially to the end-removing, end splitting and end spreading means on the base and to the respective means to control the operating means included in the peeling heads.

16. A machine for peeling bananas as claimed in claim 15 wherein, the means to control the operating means included in the peeling heads are cams.

References Cited

UNITED STATES PATENTS

| 2,300,312 | 10/1942 | Polk | 146—3 |
| 2,888,969 | 6/1959 | Hardesty et al. | 146—43 |
| 3,073,365 | 1/1963 | Polk et al. | 146—43 X |

W. GRAYDON ABERCROMBIE, *Primary Examiner.*

U.S. Cl. X.R.

146—5, 43, 241; 198—33